April 14, 1931.  F. M. CARROLL  1,800,374
TABULATING CARD AND SALES SLIP HOLDER
Filed July 6, 1927  2 Sheets-Sheet 1

Inventor
Fred M. Carroll
By his Attorney

April 14, 1931.  F. M. CARROLL  1,800,374
TABULATING CARD AND SALES SLIP HOLDER
Filed July 6, 1927  2 Sheets-Sheet 2
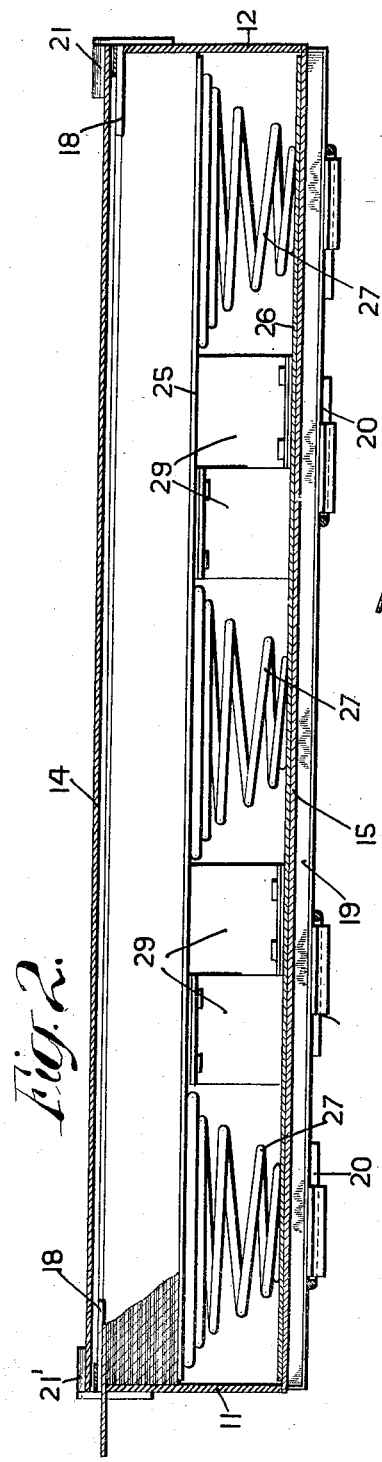
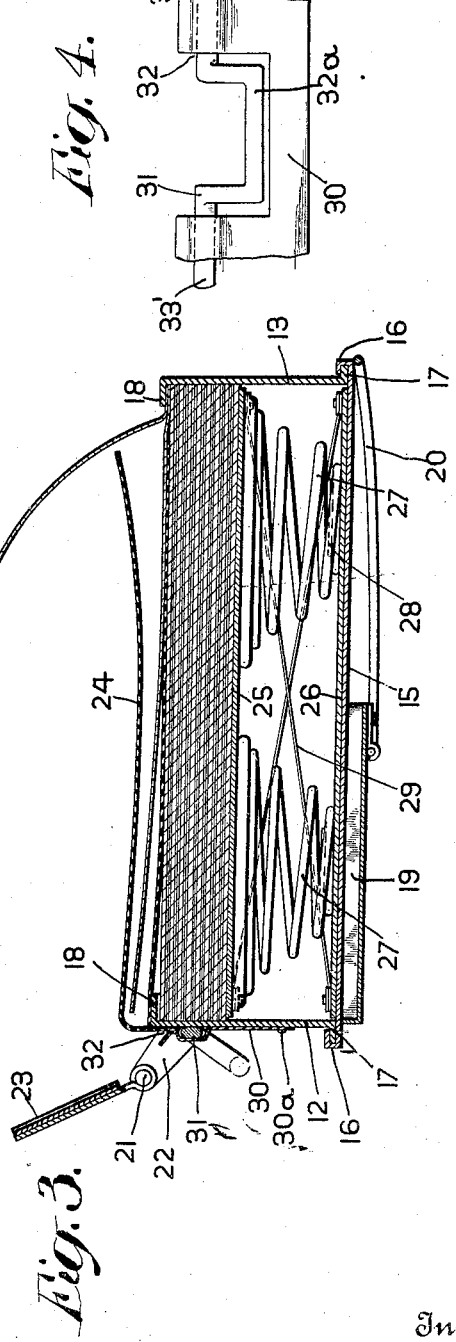
Inventor
Fred M. Carroll
By his Attorney Patented Apr. 14, 1931

1,800,374

UNITED STATES PATENT OFFICE

FRED M. CARROLL, OF YONKERS, NEW YORK, ASSIGNOR TO THE TABULATING MACHINE COMPANY, OF ENDICOTT, NEW YORK, A CORPORATION OF NEW JERSEY

TABULATING CARD AND SALES-SLIP HOLDER

Application filed July 6, 1927. Serial No. 203,745.

This invention is designed for use in connection with sales record systems and relates particularly to a holder for supporting the sales slips or sheets of paper upon which records of sales are made.

In former commercial practice especially in department stores it is customary to make out a sales slip for each sales transaction whether it be a cash or credit sale; said sales slip showing date, items purchased, the price, total amount of the sale and any other indicia pertaining to the sale. Ordinarily these aforesaid sales slips are provided in book form in which they are bound by means of staples or other well known book-binding methods. A duplicate sales slip is made simultaneously with the original by means of carbon paper or the like in the usual manner. In the case of a cash sale the clerk after writing the desired information on the sales slip sends it along with the duplicate sales slip to the cashier who retains the original and returns the duplicate sales slip to the clerk. This duplicate sales slip is given to the purchaser. A credit sale is handled in a similar manner but before the purchaser receives the goods purchased the original sales slip must be approved by some authorizer; the duplicate sales slip in this case also being handed to the purchaser with the goods purchased. At the end of the day's business all the original sales slips retained by the cashier are sent by the latter to the accounting department where the information on the slips is posted and in the case of tabulating machine systems may be perforated on tabulating cards for subsequent accounting operations.

According to the present invention the sales slips referred to above may be co-operatively associated with a tabulating card and the data transfer material therefor so that the data upon the original sales slip may be simultaneously duplicated upon a tabulating card and also upon a duplicate sales slip which is given to the purchaser. All the sales slips associated with the tabulating cards may also be provided with index point designations preferably upon the rear face thereof then arranged in the same manner as on the tabulating card so that the tabulating card may be easily compared or identified with the sales slip originally associated therewith. In making a transaction the clerk will write upon the sales slip and through a piece of carbon paper the information is simultaneously transferred to a duplicate and triplicate sales slip, the triplicate in this case being the tabulating card. The sales slips, including the tabulating card are then placed in a perforating machine wherein they are positioned in the same order as they are removed from the sales slip holder and the information is then perforated on the slips and tabulating cards pertaining to the sale. The original and duplicate sales slips are then removed from the machine and the tabulating card permitted to remain in the perforating machine until the end of the day when they are removed and forwarded to the accounting department. By the use of the index point designations on the sales slips for subsequent accounting operations it will be understood that a supplemental means is provided for cross checking the cards and correlated sales slips. Obviously with such a system, that is, having all the sales slips and correlated tabulating cards operated upon simultaneously a great savings in time and expense can be made. Thus under the system just described the original and duplicate sales slips and also the associated tabulating card will be supplied with the necessary written data simultaneously and also the original and duplicate sales slips and tabulating card will be simultaneously perforated for use in further accounting operations. Under the former practice as explained above the sales slips and tabulating cards were filled out in separate operations and the tabulating card alone punched without punching the corresponding sales slips. Frequently in such systems the tabulating card is identified with the sales slip only by arbitrary identification marks and there is no verification of the sales slips of the proper punching on the tabulating card. It is thus seen that the system with which my invention is adapted to be used involves a great saving in time and expense and also a means of ready comparison between the sales slips and correlated tabulating card.

These tabulating cards in order to be utilized in automatic accounting machines should be extremely accurate in their measurements and should also have clean cut edges. It is, therefore, obvious if the tabulating cards were bound in book form by staples or other methods the tabulating card when torn therefrom would have at least one rough edge. The object of my invention is to produce in a practical and efficient form a holder which is adapted to maintain at all times the tabulating cards and original and duplicate record sheets together with the carbon sheets between them in proper and accurate adjustment with respect to each other without the necessity of binding same by staples or the like.

Another object is to eliminate the necessity of having to bind sales slips and record cards of this nature in book form.

Another object is to provide a holder for record sheets and record cards whereby the removal of a record card will not require or necessitate tearing off an edge of the card from the holder thereby avoiding any possibility of a rough or torn edge.

These and other objects of my invention will be hereinafter pointed out in the accompanying specification and claims and shown in the drawings which show by way of illustration what I consider to be a preferred embodiment of my invention.

The preferred form of my invention consists of a rectangular box with an open top and of dimensions slightly larger than the records which are to be held therein. The side walls of the box are provided with flanges or angular projections to retain the records in the box while permitting the top one to be written on. The box is provided with a removable bottom to permit the records to be placed in the box. A spring pressed follower is also provided between the records and the bottom of the box to yieldingly force the records upwardly against the flanges or projections. The springs of the follower are sufficiently strong to prevent escape of the records from the box and are sufficiently weak to allow the records to be released from engagement with the flanges or projections and removed from the box by a slight flexure. Preferably a hinged cover is provided to protect the exposed top record when the box is not in use and suitable clips or grooves may be provided in the cover to hold a memorandum or other slip thereon.

It is contemplated in the present case that the records will exist in sets, each set consisting of one duplicate card and one or more paper slips on which entries may be written. It is also contemplated that each entry made on the top sheet will be duplicated on the other sheets and on the tabulating card. While any method of transferring may be used it is preferred to use carbon paper and a spring clip or series of spring clips may be provided on each side of the box to permit the carbon sheets to be held in proper position to allow them to be folded across the top of the box and inserted between the several records of a set.

In the use of the device the records of each set with the exception of the lowermost one, are released from the flanges on one side of the box permitting them to be still held at one edge by the flanges on the other side. The carbon sheets may then be interleaved with the records so as to properly duplicate the entries made on the topmost one. After the entries are completed the entire set is removed from the box and disposed of in a manner dictated by the requirements of the accounting system in use, and the next set of records may be properly arranged for entering the next transaction.

In the accompanying drawings forming part of this specification a practical commercial embodiment of my invention is disclosed, but as such illustration is merely for purposes of disclosure, it will be understood that my record sheet and record card holder may be modified in various respects without departing from the broad spirit and scope of my invention as hereinafter defined and claimed.

The accompanying drawings illustrate the preferred embodiment of my invention.

Fig. 2 is a section taken on line 2—2 of Fig. 1.

Fig. 3 is an end sectional view taken on line 3—3 of Fig. 1.

Fig. 4 is a detail view of the means for holding the carbon paper.

Figure 1:
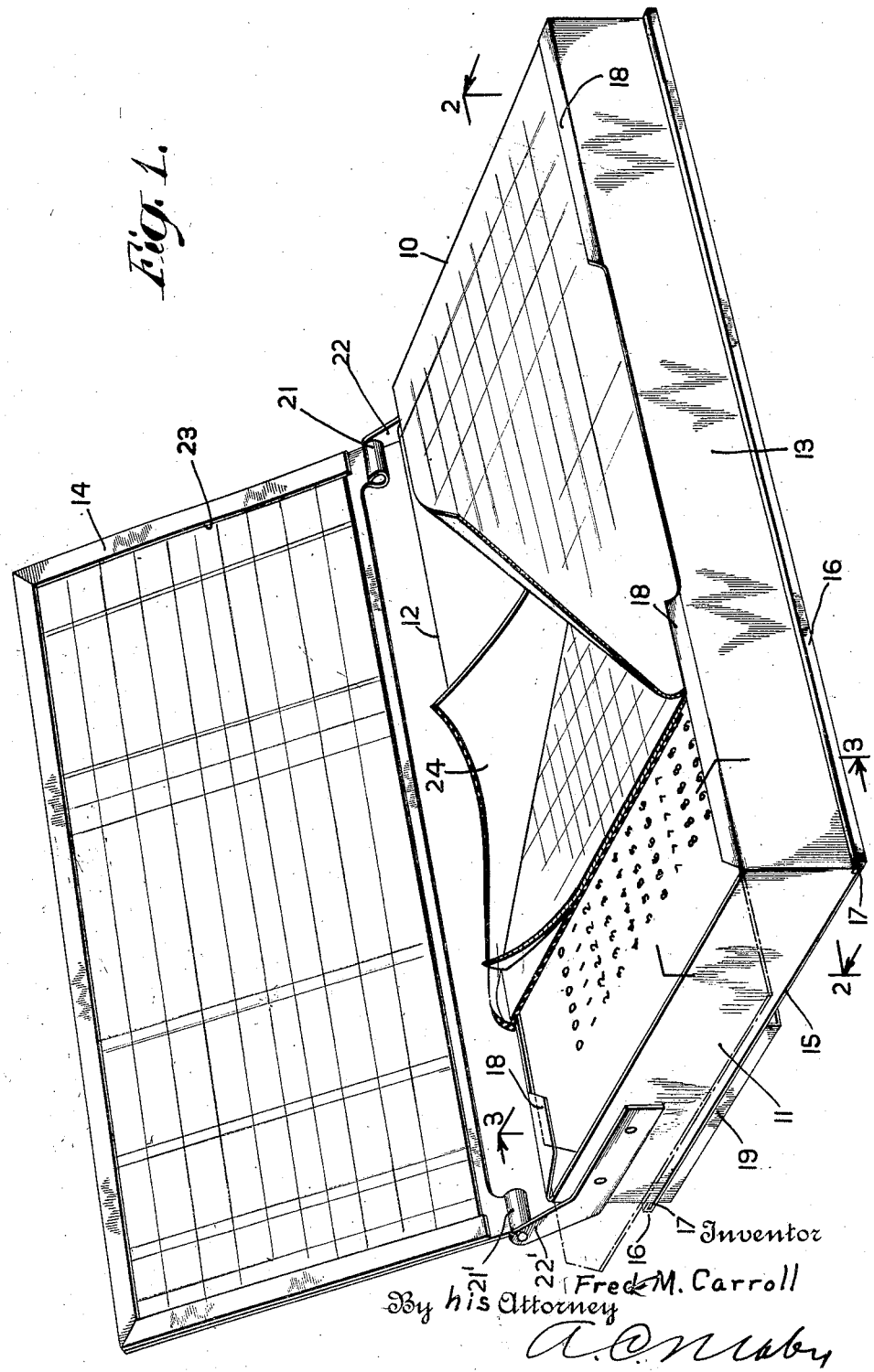
Fig. 1 is a perspective view of my record sheet and record card holder with sheets and cards therein.

Referring more particularly to the drawings Fig. 1 represents my holder as comprising a plurality of end walls 10 and 11, a rear wall 12, a front wall 13, a top or cover 14 and a slidable bottom 15. The slidable bottom 15 has its side edges rolled back to form grooves 16 which slide upon lateral projections 17 of the front and rear walls 13 and 12 respectively. The bottom 15 may be pushed along the lateral projections 17 in either direction. The purpose of this removable or slidable bottom member 15 is to facilitate placing of records in the box as will presently appear.

Integral with the front and rear walls 12 and 13 are projecting tabs or flanges 18 (Fig. 1) for retaining the cards and sheets in their proper positions in the holder.

Reference will now be had to Figs. 2 and 3 in which means for supporting the record sheets and record cards are disclosed along with the means for holding the carbon sheets. Fig. 2 discloses a spring actuated follower unit to force the records upwardly against the projections 18 formed on the sides. The unit comprises an upper plate 25 and a lower plate 26 forced apart by a plurality of coil springs 27 which may be attached to one of the plates as, for instance, to the lower plate 26 as shown at 28 in Fig. 3. The upper plate 25 may rest on top of the springs 27 and by means of tapes 29 or any other suitable means, the top plate 25 is prevented from being separated from the unit, but is mounted so that the two plates 25 and 26 may be pressed together.

In order to insert the records into the holder the bottom plate 15 previously referred to is removed by sliding same along the lateral projections 17 in either direction. After the bottom has thus been removed the spring actuated follower unit above referred to is also removed from the holder. The records are then placed in order in the holder, that is, according to the present system the original and duplicate sales slip ahead of the tabulating card. The spring actuated follower unit is then placed beneath the lowermost record. The lower plate 26 of the unit is then slightly depressed in order to facilitate the replacing of the bottom 15. Obviously after the bottom 15 has been thus positioned the follower unit through the action of the coil springs 27 heretofore described, will at all times force the records upwardly against the flanges or projections 18. These flanges or projections will at all times retain the records in their proper positions.

As disclosed in Fig. 3 the carbon paper 24 may be attached to the rear wall 12 of the holder so that it may be readily slipped in between the record sheets and record cards and quickly assume the proper adjustment with respect thereto. For this purpose I have shown the carbon as being attached along the rear wall 12 of the holder by means of a resilient strip 30 attached at 30a (see also Fig. 4). This strip may also, if desired, be integral with the wall or mounted in any other suitable manner. In order to insert or remove the carbon paper 24 an operating member 31 is provided. This member is fitted in a groove 32 which groove is between the strip 30 and the rear wall 12. The adjusting member 31 has two projecting arms 33 and 33' extending in different directions in the groove 32. Each of the arms 33 and 33' are flattened so that when the adjusting member 31 is turned about its axis it will, through the flattened arms, cam strip 30 away from the rear wall 12 far enough to allow the removal or insertion of the carbon 24. As disclosed the operating member 31 is formed with an offset portion 32a which serves as a handle for actuating it.

A pocket 19 is formed upon the slidable or removable bottom 15 which may be used for extra cards or the like. A plurality of spring hinged clips 20 are mounted on the pocket 19 to hold the extra cards or the like in the pocket.

The top or cover 14 as disclosed in Fig. 1 is mounted on the holder by means of hinged members 21 and 21' and brackets 22 and 22' fixed to the sides of the end walls 10 and 11. The lateral projecting edges 23 on the top or cover 14 are provided for holding a sample record card or a sheet of paper upon which a memorandum of each transaction may be made.

While I have shown and described and pointed out the fundamental novel features of the invention as applied to a single modification, it will be understood that various omissions, substitutions and changes in the form and details of the device illustrated and in its operation may be made by those skilled in the art without departing from the spirit of the invention. I intend to be limited therefore, only as indicated by the scope of the following claims.

What is claimed is:

1. In a device for holding sets of accounting records in superimposed relation, said device including a container formed as a box-like structure with an opening in the top to expose the record receiving portions of said record, means for detachably holding transfer material, said last named means including a grooved resilient metal strip fixed on the container adjacent one edge of the records therein and a movable operating element having a camming element for moving said strip to non-holding position.

2. A device of the class described, comprising a four-sided body, a plate movably connected to the bottom of said body, a card supporting structure removably supported on said plate, said structure including a pair of spaced plates and springs between said plates to normally separate said spaced plates, said body being provided with projecting tabs at the top for releasably holding cards within said body.

3. In a device including a box-like structure for holding record sheets in position for marking, a clamp attached to one side of said structure for holding carbon sheets in juxtaposition to said record sheets, and a camming device for camming said clamp away from the carbon sheets to permit their removal or insertion.

4. In a device of the class described including a box-like structure for holding record sheets in position for marking, a clamp attached to one of the sides of said structure for holding carbon sheets in juxtaposition to said record sheets, said clamp having an offset portion, and a cam located in said portion and provided with a handle for camming said clamp away from said side of the box-like structure to permit removal or insertion of a carbon sheet.

5. In a device comprising a box-like structure for holding record sheets in position for marking, a clamp attached to said structure for holding a carbon sheet in juxtaposition to said record sheets, and means on said structure movable relative to said clamp for releasing the latter from the carbon sheet.

6. In a device comprising a box-like structure for holding record sheets in position for marking, a device attached to said structure for holding a carbon sheet in juxtaposition to said record sheets, a member on said structure separate from said device and effective to release said device from the carbon sheet, and a handle for operating said member.

7. A device comprising a box-like structure for holding record sheets, said structure having a removable bottom and means for forcing the record sheets upwardly towards the top of said structure, said means including a pair of plates the bottom one of which rests on said removable bottom and the upper one of which engages the bottom record sheet and springs attached to said plates and between them to force the upper plate upwardly.

8. A record sheet holder comprising a case open at opposite sides, a record sheet carrier within the case and having means for moving record sheets inside the case towards one open side, and a closure element for the other open side, said element being adapted to support the sheet carrier and retain it in the case, and said elements being movably mounted on the case to permit egress of the carrier through the last-mentioned open side of the case.

9. A record sheet holder such as described in claim 8, and means provided on the case projecting over the open side towards which the record sheets are moved for releasably holding the record sheets inside the case.

10. A record sheet holder such as described in claim 8, said closure element and said case having cooperating means for slidably, removably, mounting the element on the case.

11. A record sheet holder comprising a container open at opposite sides, a record sheet carrier having means for moving sheets inside the container towards one of said sides, means provided on the container and projecting over the latter open side to releasably prevent egress of sheets through said latter side, and means for releasably retaining the carrier within the container, said latter means being movable at will to permit egress of the carrier through the open side opposite the one towards which the record sheets are moved.

In testimony whereof I hereto affix my signature.

FRED M. CARROLL.